United States Patent [19]

Chang

[11] Patent Number: 5,588,793

[45] Date of Patent: Dec. 31, 1996

[54] ELEVATOR MECHANISM FOR VEHICLE

[76] Inventor: Hueng-San Chang, 12, Si Wei St., Taoyuan, Taiwan

[21] Appl. No.: 397,407

[22] Filed: Mar. 2, 1995

[51] Int. Cl.⁶ .................................. B60P 1/26; B60F 1/00
[52] U.S. Cl. ........................ 414/557; 414/917; 187/250; 187/345
[58] Field of Search ..................... 187/244, 269, 187/272, 273, 274, 250, 211, 215, 345, 346; 414/556, 557, 558, 917, 921

[56] References Cited

U.S. PATENT DOCUMENTS

| 4,005,788 | 2/1977 | Ratliff | 414/557 X |
| 4,569,626 | 2/1986 | Svanberg | 414/557 |

FOREIGN PATENT DOCUMENTS

| 3105251 | 9/1982 | Germany | 414/557 X |
| 63-297134 | 12/1988 | Japan | 414/556 X |
| 2102761 | 2/1983 | United Kingdom | 414/557 X |

*Primary Examiner*—James R. Bidwell
*Assistant Examiner*—Khoj H. Tran
*Attorney, Agent, or Firm*—Peterson, Wicks, Nemer & Kamrath, P.A.

[57] ABSTRACT

An elevator mechanism is disposed in the rear portion for rotating the rear panel of the vehicle and includes two pairs of links pivotally coupled in parallel between two couplers and a support of the vehicle so as to stably support the coupler. An actuator is coupled between the support and the coupler for moving the coupler upward and downward. A panel is pivotally coupled to the upper portion of the coupler and an actuator is coupled between the bottom of the panel and the middle portion of the coupler for rotating the panel about the upper portion of the coupler.

3 Claims, 6 Drawing Sheets

5,588,793

ELEVATOR MECHANISM FOR VEHICLE

BACKGROUND OF THE INVENTION

1. Field of the Invention

The present invention relates to an elevator, and more particularly to an elevator mechanism for a vehicle.

2. Description of the Prior Art

A typical elevator mechanism for a vehicle is shown in FIG. 8 and comprises a rear panel E pivotally coupled to the rear portion of the vehicle by a link Z and includes an extension X laterally extended therefrom for engaging with an actuator Y which couples the extension X to the vehicle. The panel E includes a stop W for engaging with a projection T of the vehicle. However, the rear panel E has only one end pivotally coupled to the rear portion of the vehicle such that the rear panel E may not be stably retained in place.

The present invention has arisen to mitigate and/or obviate the afore-described disadvantages of the conventional elevator mechanisms for vehicles.

SUMMARY OF THE INVENTION

The primary objective of the present invention is to provide an elevator mechanism for a vehicle in which the mechanism includes a solid and stable structure.

In accordance with one aspect of the invention, there is provided an elevator mechanism for a vehicle comprising at least one support for securing to the vehicle, the support including an upper portion and a lower portion, at least one coupler including an upper portion, a middle portion and a lower portion, at least one first link pivotally coupled between the upper portion of the support and the upper portion of the coupler, at least one second link pivotally coupled between the lower portion of the support and the lower portion of the coupler for stably supporting the coupler, at least one first actuator means engaged between the first link and the second link and including a first end pivotally coupled to the lower portion of the support and a second end pivotally coupled to the upper portion of the coupler for moving the coupler upward and downward, a panel pivotally coupled to the upper portion of the coupler and rotatable about the upper portion of the coupler, the panel including a bottom surface having a middle portion, and at least one second actuator means pivotally coupled between the middle portion of said bottom surface of the panel and the middle portion of the coupler for rotating the panel about the upper portion of the coupler.

The first link and the second link each include a U-shaped cross section for covering and for protecting the first actuator means and for reinforcing purposes.

At least one casing is further secured to the bottom surface of the panel for covering and for protecting the second actuator means.

The second end of the first actuator means may be coupled to the middle portion of the coupler.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
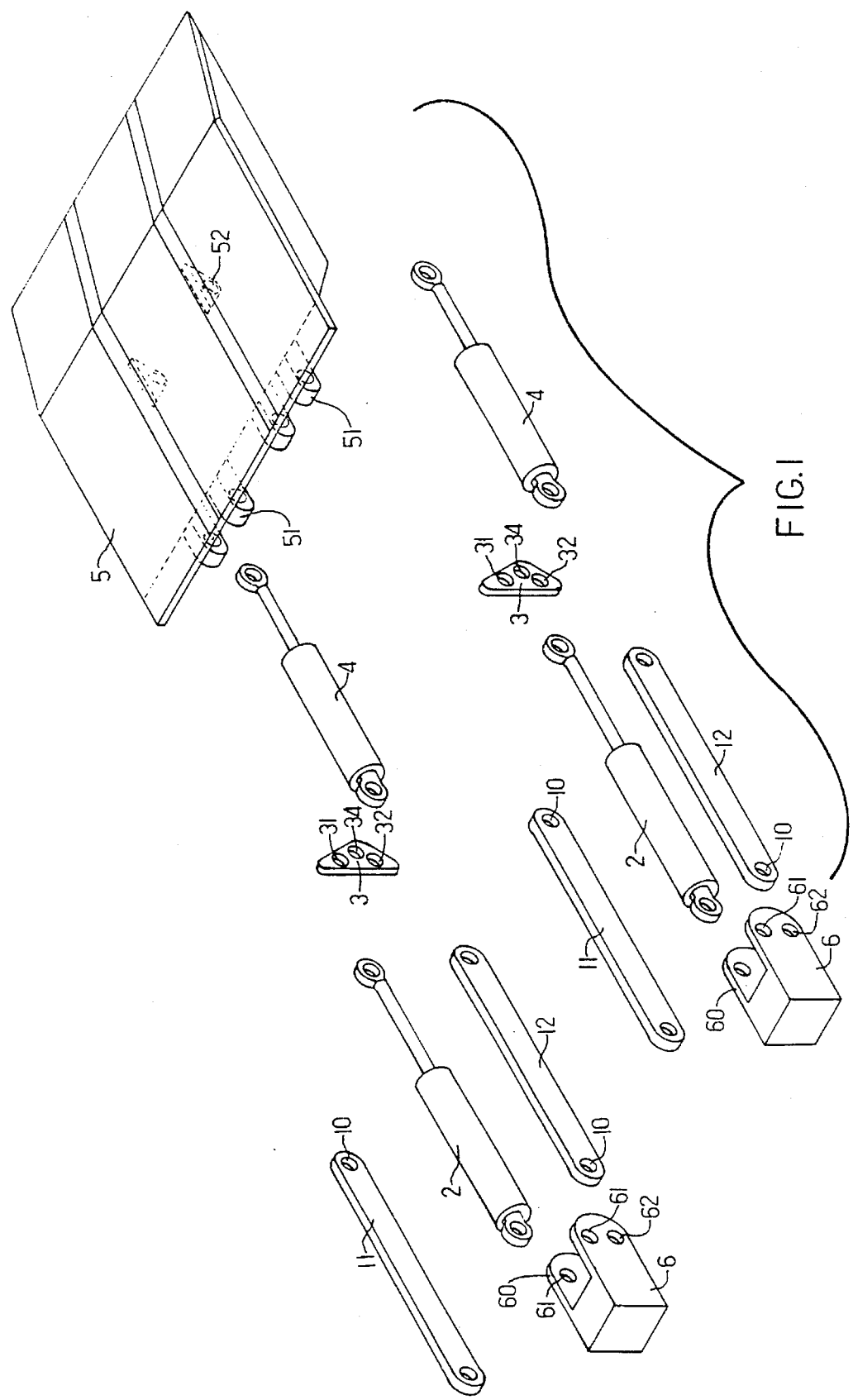
FIG. 1 is an exploded view of an elevator mechanism for a vehicle in accordance with the present invention.
Figure 2:
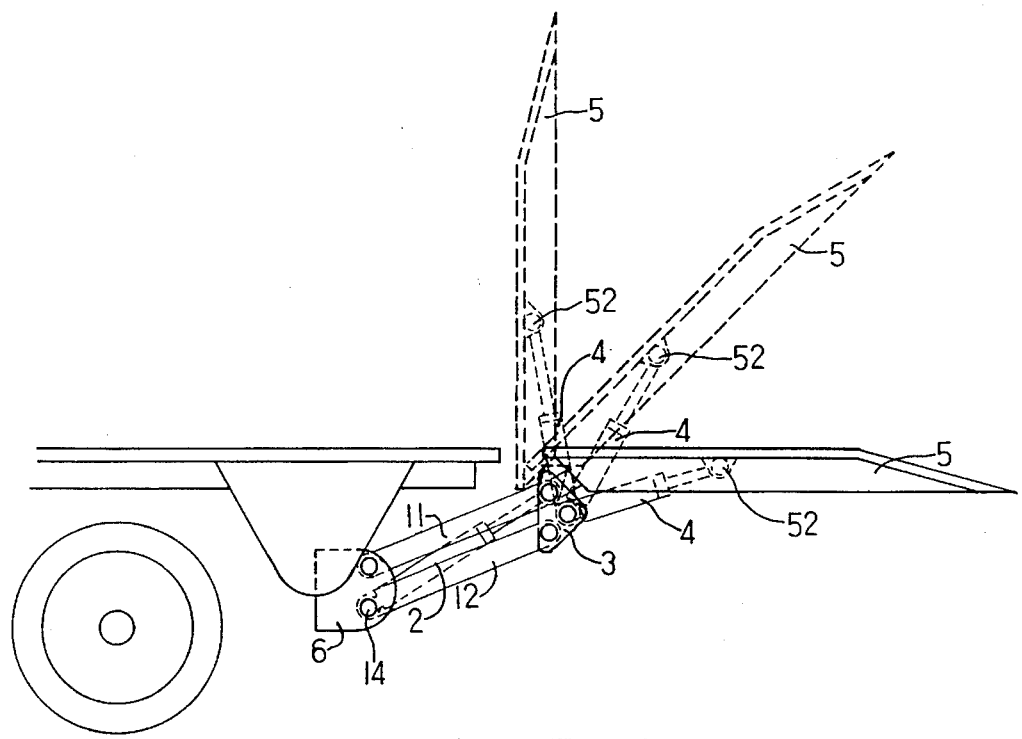
FIGS. 2 and 3 are side views illustrating the operation of the elevator mechanism.
Figure 3:
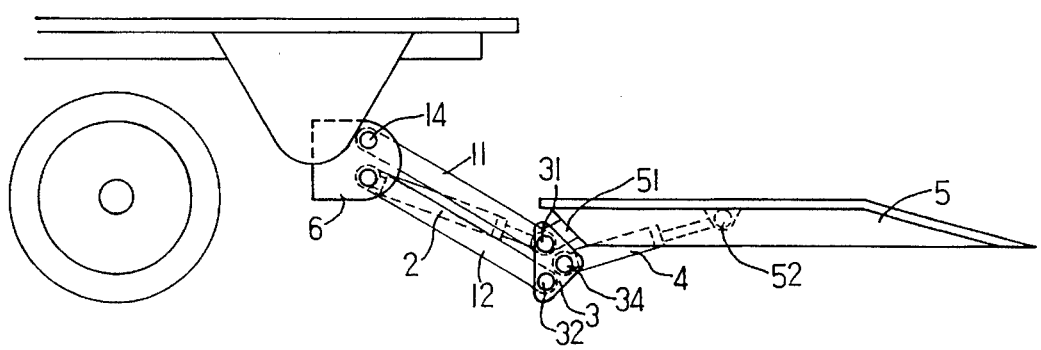
Figure 4:
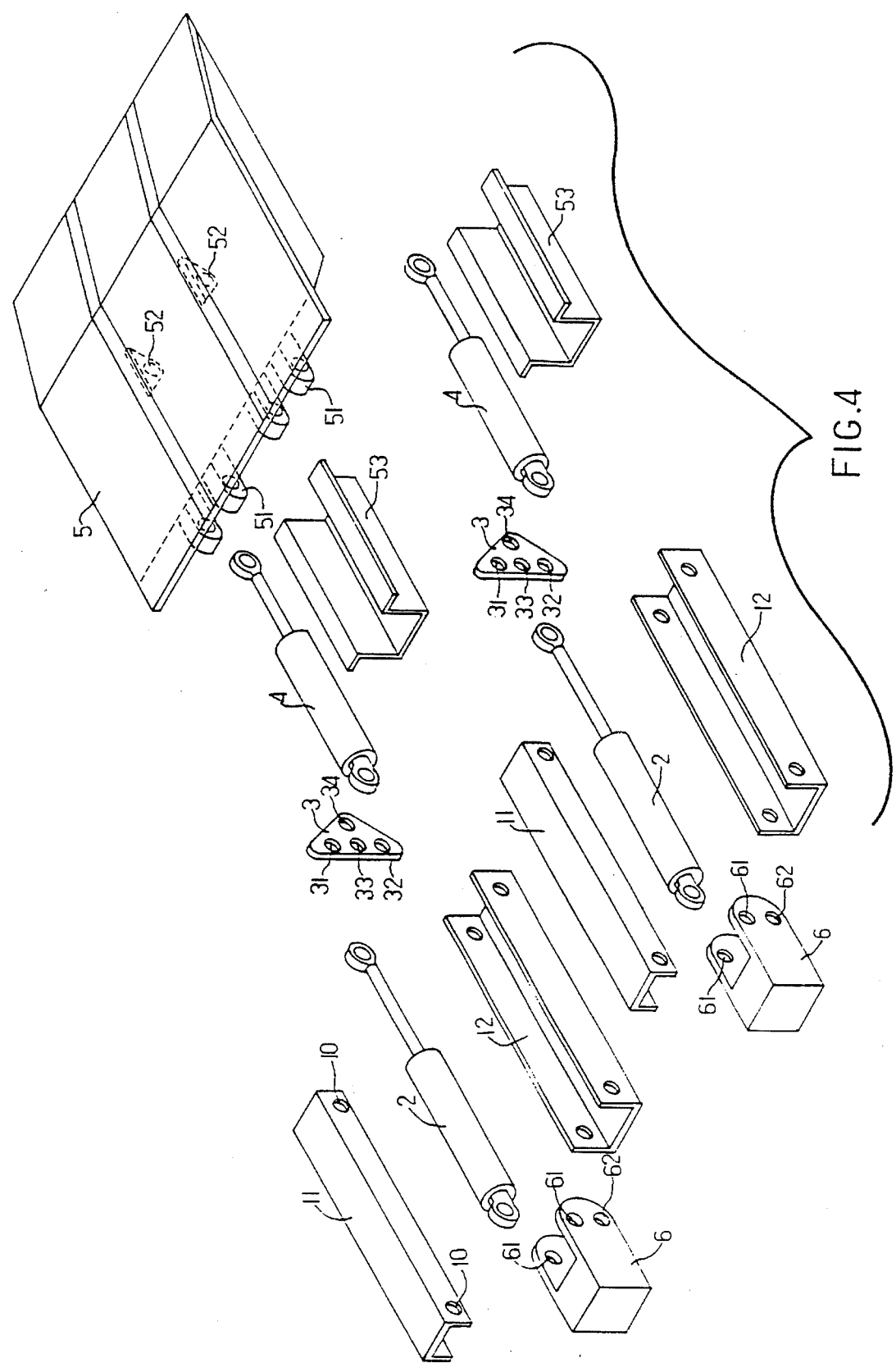
FIG. 4 is an exploded view showing another application of the elevator mechanism in accordance with the present invention.
Figure 5:
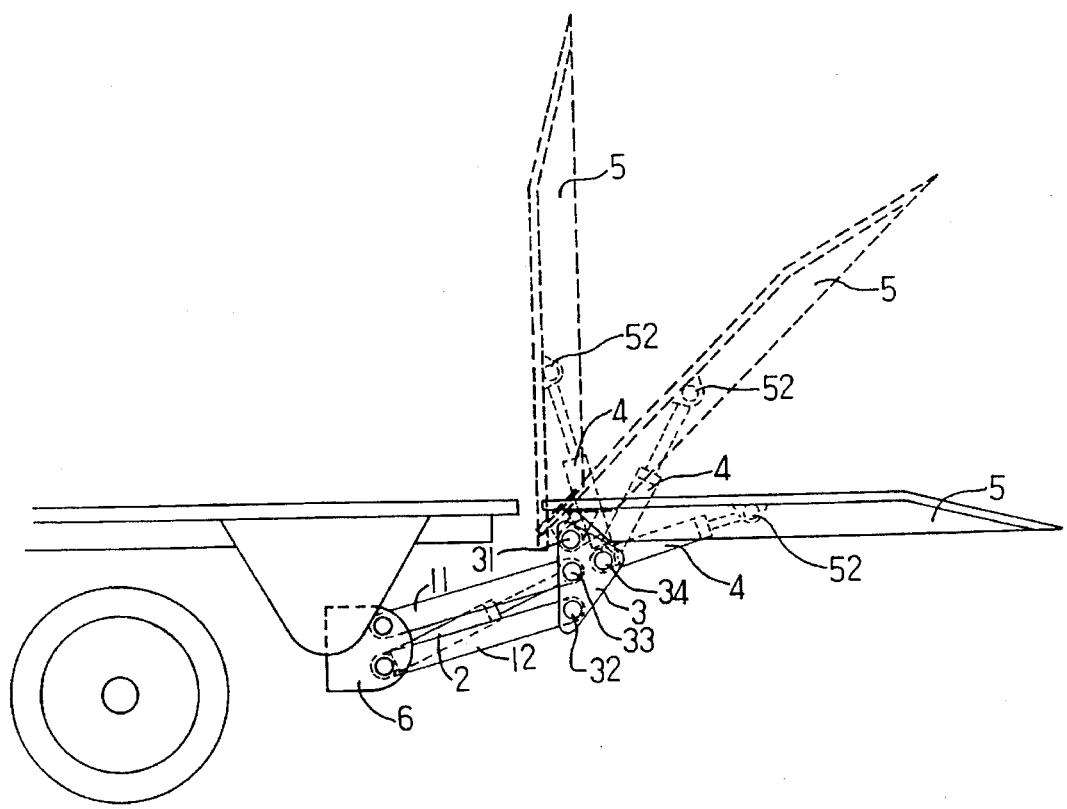
FIGS. 5, 6 and 7 are side views illustrating the operation of the elevator mechanism.
Figure 6:
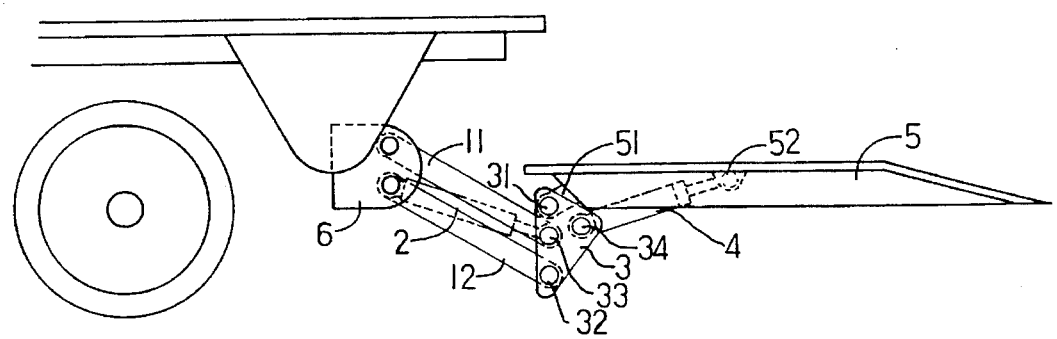
Figure 7:
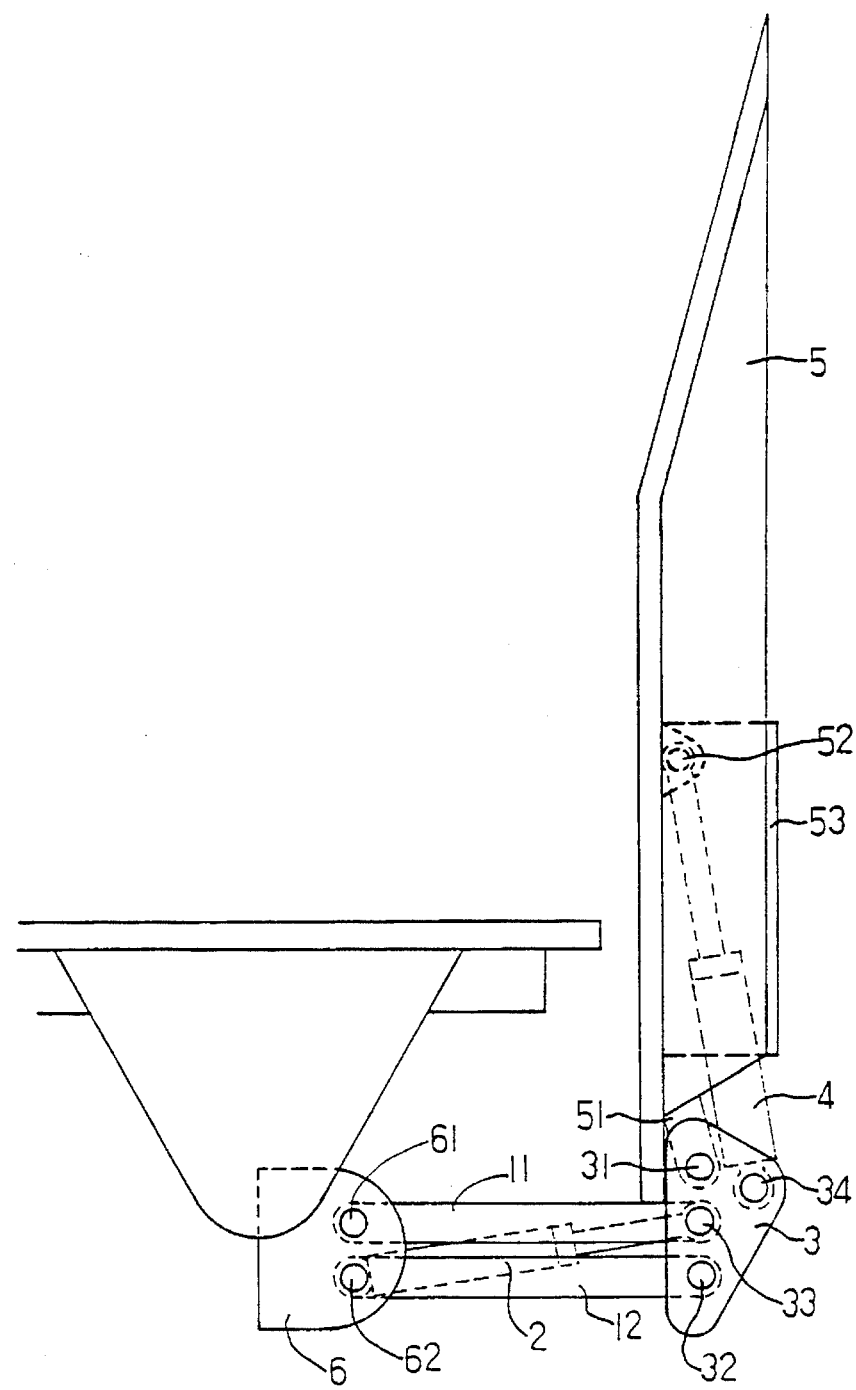
Figure 8:
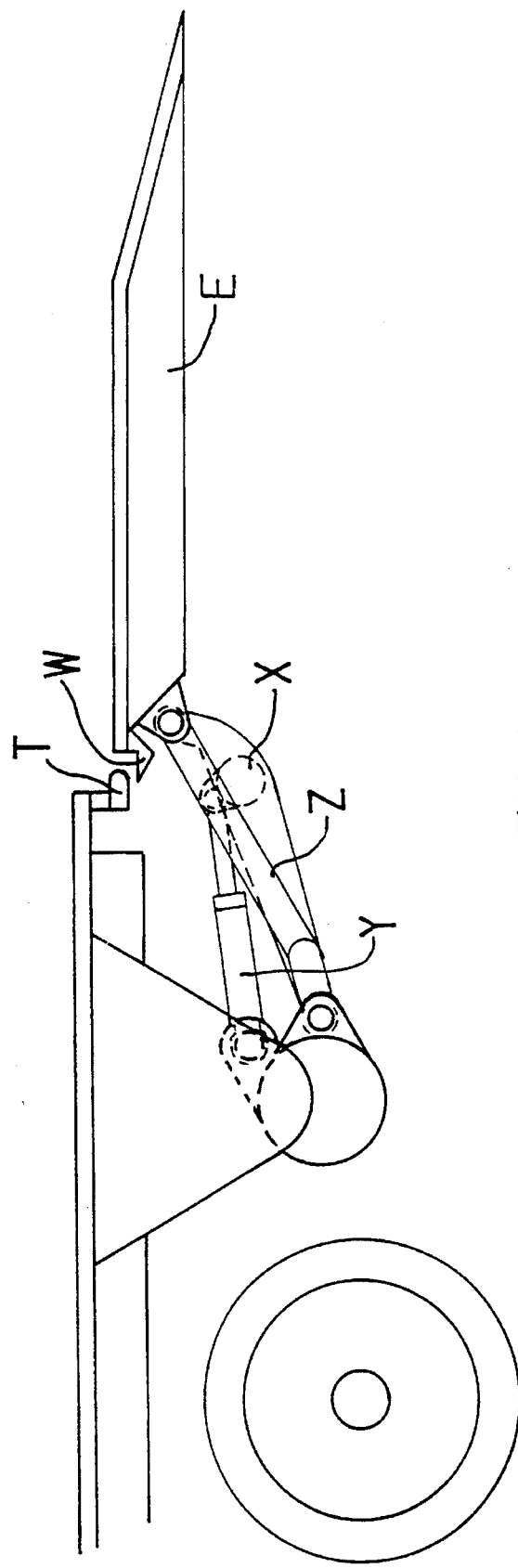
FIG. 8 is a side view showing a typical elevator mechanism for vehicles.

Referring to the drawings, and initially to FIGS. 1 to 3, an elevator mechanism in accordance with the present invention comprises two supports 6 which may be secured to the rear portion of the vehicle or may be formed integral with the vehicle. The supports 6 each include a pair of ears 60, the ears 60 each includes an upper hole 61 and a lower hole 62 formed therein. Two couplers 3 each include an upper orifice 31, a middle orifice 34 and a lower orifice 32. Two pairs of links 11, 12 each includes two ends having a hole 10 formed therein. Pivot pins or bolts 14 may engage through the holes 10, 31, 61 for coupling the links 11 to the upper holes 61 of the supports 6 and to the upper orifices 31 of the couplers 3. Similarly, pivot pins or bolts 14 may engage through the holes 10, 32, 62 for coupling the links 12 to the lower holes 62 of the supports 6 and to the lower orifices 32 of the couplers 3, such that the couplers 3 may be stably and pivotally coupled to the supports 6, best shown in FIGS. 2 and 3. A pair of actuators 2 include one end pivotally coupled to the supports 6 at the pivot pins 14 and located between first end portions of the links 12 and include the other end pivotally coupled to the upper orifices 31 of the couplers 3, such that the couplers 3 may be moved upward and downward by the actuators 2.

A panel 5 includes two pairs of lugs 51 pivotally coupled to the upper orifices 31 and includes two lumps 52 formed in the middle portion of the bottom. Two actuators 4 are pivotally coupled between the middle orifices 34 of the couplers 3 and the lumps 52 of the panel 5 such that the panel 5 may be rotated about the upper orifices 31 by the actuators 4. The panel 5 may be stably operated by the actuators 4.

Referring next to FIGS. 4 to 7, alternatively, the links 11, 12 may include a U-shaped cross section for reinforcing purposes. The actuators 2 may be partially covered by the links 11, 12. The couplers 3 each may further include a middle orifice 33 and a front orifice 34 for engaging with the links 11 and the actuators 2 and 4, best shown in FIGS. 5 to 7. Two casings 53 may further be secured to the bottom portion of the panel 5 for covering and for protecting the actuators 4.

Accordingly, the elevator mechanism in accordance with the present invention includes a panel that may be stably supported and operated.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An elevator mechanism for a vehicle comprising:

at least one support for securing an elevator mechanism to a vehicle, said support including an upper portion and a lower portion, at least one coupler including an upper portion, a middle portion and a lower portion, at least one first link pivotally coupled between said upper portion of said support and said upper portion of said coupler, at least one second link pivotally coupled between said lower portion of said support and said lower portion of said coupler for stably supporting said coupler, at least one first actuator means engaged between said first link and said second link and including a first end pivotally coupled to said lower portion of said support and a second end pivotally connected to said coupler for moving said coupler upward and downward, a panel pivotally coupled to said upper portion of said coupler and rotatable about said upper portion of said coupler, said panel including a bottom surface having a middle portion, and at least one second actuator means pivotally coupled between said middle portion of said bottom surface of said panel and said middle portion of said coupler for rotating said panel about said upper portion of said coupler.

2. An elevator mechanism according to claim 1, wherein said first link and said second link each includes a U-shaped cross section for covering and for protecting said first actuator means and for reinforcing purposes.

3. An elevator mechanism according to claim 1 further comprising at least one casing secured to said bottom surface of said panel for covering and for protecting said second actuator means.

* * * * *